US012526502B2

(12) United States Patent
Lee et al.

(10) Patent No.: US 12,526,502 B2
(45) Date of Patent: Jan. 13, 2026

(54) CAMERA MODULE AND METHOD OF MANUFACTURING HOUSING OF CAMERA MODULE

(71) Applicant: Samsung Electro-Mechanics Co., Ltd., Suwon-si (KR)

(72) Inventors: Sangjin Lee, Suwon-si (KR); Mansu Kim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 140 days.

(21) Appl. No.: 18/207,589

(22) Filed: Jun. 8, 2023

(65) Prior Publication Data

US 2023/0403453 A1    Dec. 14, 2023

(30) Foreign Application Priority Data

Jun. 8, 2022   (KR) .......................... 10-2022-0069690
Aug. 26, 2022  (KR) .......................... 10-2022-0107675

(51) Int. Cl.
*H04N 23/55*   (2023.01)
*G02B 7/09*    (2021.01)
(Continued)

(52) U.S. Cl.
CPC .............. *H04N 23/55* (2023.01); *G02B 7/09* (2013.01); *G03B 13/36* (2013.01); *G03B 17/12* (2013.01);
(Continued)

(58) Field of Classification Search
CPC ........ H04N 23/55; H04N 23/51; H04N 23/54; H04N 23/687; H04N 23/57; G02B 7/09;
(Continued)

(56) References Cited

U.S. PATENT DOCUMENTS

2020/0192187 A1*  6/2020  Lee .................... H02K 41/0356
2021/0018729 A1*  1/2021  Li ...................... G02B 13/0045
(Continued)

FOREIGN PATENT DOCUMENTS

JP      20090097578       *  9/2006   ... H01L 2224/73204
KR    10-2006-0097578 A       9/2006
(Continued)

OTHER PUBLICATIONS

Machine English translation of KR 10-2006-0097578 A published on Sep. 14, 2016 to Tomohiro Nomura et al. (17 pages). (Year: 2006).*

(Continued)

*Primary Examiner* — Lin Ye
*Assistant Examiner* — Chan T Nguyen
(74) *Attorney, Agent, or Firm* — NSIP Law

(57) ABSTRACT

A camera module includes a lens barrel; a driver configured to move the lens barrel; and a housing in which the lens barrel is disposed, wherein the driver includes a wire layer configured to transmit an electrical signal; a driving circuit part electrically connected to the wire layer; a coil electrically connected to the wire layer; and a magnet electromagnetically coupled to the coil, and the wire layer is a stamped metal part integrally combined with the housing.

21 Claims, 17 Drawing Sheets

(51) Int. Cl.
   *G03B 13/36* (2021.01)
   *G03B 17/12* (2021.01)
   *H04N 23/51* (2023.01)
   *H04N 23/54* (2023.01)
   *H04N 23/68* (2023.01)

(52) U.S. Cl.
   CPC ............. *H04N 23/51* (2023.01); *H04N 23/54* (2023.01); *H04N 23/687* (2023.01)

(58) Field of Classification Search
   CPC .......... G02B 7/08; G03B 13/36; G03B 17/12; G03B 3/10
   USPC ......................................................... 348/335
   See application file for complete search history.

(56) References Cited

U.S. PATENT DOCUMENTS

| | | | | |
|---|---|---|---|---|
| 2021/0048729 | A1* | 2/2021 | Yoon | G03B 30/00 |
| 2021/0271049 | A1* | 9/2021 | Seo | G03B 13/36 |

FOREIGN PATENT DOCUMENTS

| | | | | |
|---|---|---|---|---|
| KR | 20060097578 | * | 9/2006 | ............... A42B 1/18 |
| KR | 10-1314178 B1 | | 10/2013 | |
| KR | 10-2014-0036448 A | | 3/2014 | |
| KR | 10-2019-0029169 A | | 3/2019 | |
| KR | 20190029169 | * | 3/2019 | ............. G03B 13/32 |
| KR | 10-2021-0020728 A | | 2/2021 | |
| KR | 10-2021-0110139 A | | 9/2021 | |

OTHER PUBLICATIONS

Machine English translation of KR 10-2019-0029169 A published on Mar. 20, 2019 to Seung Ho Choi et al.(19 pages). (Year: 2019).*

Korean Office Action issued on Sep. 11, 2024, in counterpart Korean Patent Application No. 10-2022-0107675 (7 pages in English, 6 pages in Korean).

Korean Office Action Issued on Apr. 26, 2025, in counterpart Korean Patent Application No. 10-2022-0107675 (3 pages in English, 3 pages in Korean).

* cited by examiner

FIG. 4
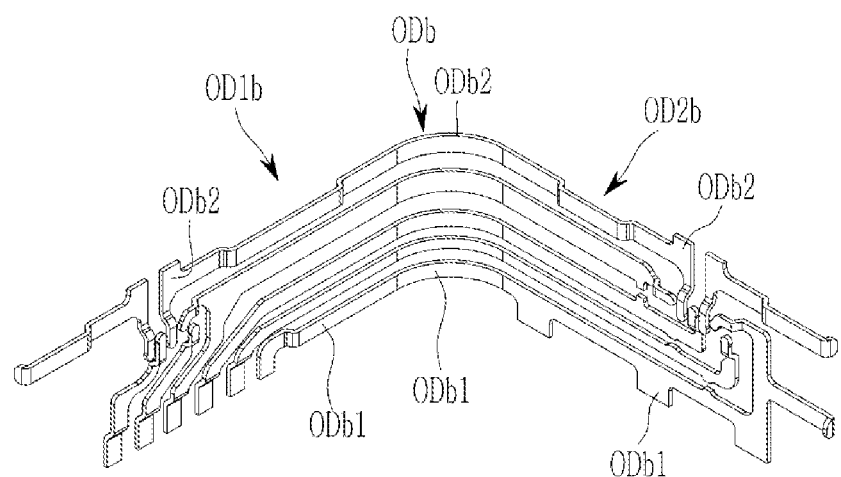
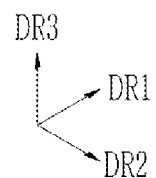

CAMERA MODULE AND METHOD OF MANUFACTURING HOUSING OF CAMERA MODULE

CROSS-REFERENCE TO RELATED APPLICATIONS

This application claims the benefit under 35 USC 119(a) of Korean Patent Application Nos. 10-2022-0069690 filed on Jun. 8, 2022, and 10-2022-0107675 filed on Aug. 26, 2022, in the Korean Intellectual Property Office, the entire disclosures of which are incorporated herein by reference for all purposes.

BACKGROUND

Field

The present disclosure relates to a camera module and a manufacturing method of a housing of the camera module.

Description of Related Art

With the remarkable development of information and communication technology and semiconductor technology, supply and use of electronic devices is rapidly increasing. These electronic devices tend to provide various functions by convergence rather than staying in their typical unique domains.

Recently, cameras have become a basic feature in portable electronic devices such as smartphones, tablet PCs, and laptop computers, and an auto focus (AF) function, and an image stabilization (IS) function and a zoom function have been added to the cameras in these portable electronic devices.

As various functions are added to a camera module, a manufacturing process of the camera module becomes complicated, increasing a manufacturing cost, and as different parts are individually formed and then assembled with each other, product quality deterioration due to assembly process errors occurs.

The above information disclosed in this Background section is only for enhancement of understanding of the background of the described technology, and therefore it may contain information that does not constitute prior art that is already known to a person of ordinary skill in the art.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a camera module includes a lens barrel; a driver configured to move the lens barrel; and a housing in which the lens barrel is disposed, wherein the driver includes a wire layer configured to transmit an electrical signal; a driving circuit part electrically connected to the wire layer; a coil electrically connected to the wire layer; and a magnet electromagnetically coupled to the coil, and the wire layer is a stamped metal part integrally combined with the housing.

The housing may include a base housing and a base part, the wire layer may be supported by the base part, and the base housing and the base part may be integrally combined in an injection-molded part.

A curing temperature of a material of the base housing may be substantially the same as a curing temperature of a material of the base part.

The wire layer may be integrally combined with the base part.

The wire layer and the coil may be integrally combined with the housing.

The coil may be a stamped metal part.

The housing may include a base housing and a base part, the wire layer may be supported by the base part, the coil may be mounted on the base part, and the base housing and the base part may be integrally combined in an injection-molded part.

The wire layer may be integrally combined with the base part, and the coil may be surface-mounted on the base part.

The wire layer, the coil, and the driving circuit part may be integrally combined with the housing.

The housing may include a base housing and a base part, the wire layer may be integrally combined with the base part, the coil and the driving circuit part may be surface-mounted on the base part, and the base housing and the base part may be integrally combined in an injection-molded part.

The driver may include a focus adjusting driver configured to move the lens barrel in an optical axis direction of the lens barrel and including a first wire layer; and a shake correcting driver configured to move the lens barrel in a direction perpendicular to the optical direction and including a second wire layer, and the first wire layer of the focus adjusting driver and the second wire layer of the shake correcting driver may be stamped metal parts integrally combined with the housing.

The shake correcting driver may include a first shake correcting driver and a second shake correcting driver, the second wire layer of the shake correcting driver may include a second wire layer of the first shake correcting driver and a second wire layer of the second shake correcting driver, and the second wire layer of the first shake correcting driver and the second wire layer of the second shake correcting driver may be electrically connected to each other.

The coil of the driver may include a first coil of the focus adjusting driver and a second coil of the shake correcting driver, and the first coil of the focus adjusting driver and the second coil of the shake correcting driver may be stamped metal parts integrally combined with the housing.

In another general aspect a method of manufacturing a housing of a camera module includes forming a wire layer of a driver that configured to drive a lens barrel by a metal stamping method; mounting the wire layer so that the wire layer is supported by a base part; combining the base part and a base housing by an injection molding method to form an injection-molded part; and curing the injection-molded part.

The mounting of the wire layer may include integrally combining the wire layer with the base part by an injection molding method.

The method may further include forming a coil of the driver; and mounting the coil on the base part.

The forming of the coil may include forming the coil by a metal stamping method.

In another general aspect, a camera module includes an injection-molded housing; a lens barrel disposed in the injection-molded housing; and a driver configured to move the lens barrel and including an injection-molded base part integrally combined with the injection-molded housing; a stamped metal wire layer integrally combined with the injection-molded base part; a driving circuit part electrically connected to the stamped metal wire layer; a coil electrically connected to the stamped metal wire layer; and a magnet electromagnetically coupled to the coil, The coil may be surface-mounted on the injection-molded base part.

The driving circuit part may be surface-mounted on the injection-molded base part.

The injection-molded housing may include a base housing integrally combined with the injection-molded base part to form the injection-molded housing.

Other features and aspects will be apparent from the following detailed description, the drawings, and the claims.

BRIEF DESCRIPTION OF DRAWINGS

FIG. 4 illustrates a perspective view of a first wire layer and a second wire layer of the housing of FIG. 3.

Throughout the drawings and the detailed description, the same reference numerals refer to the same elements. The drawings may not be to scale, and the relative sizes, proportions, and depictions of elements in the drawings may be exaggerated for clarity, illustration, and convenience.

DETAILED DESCRIPTION

Figure 1:
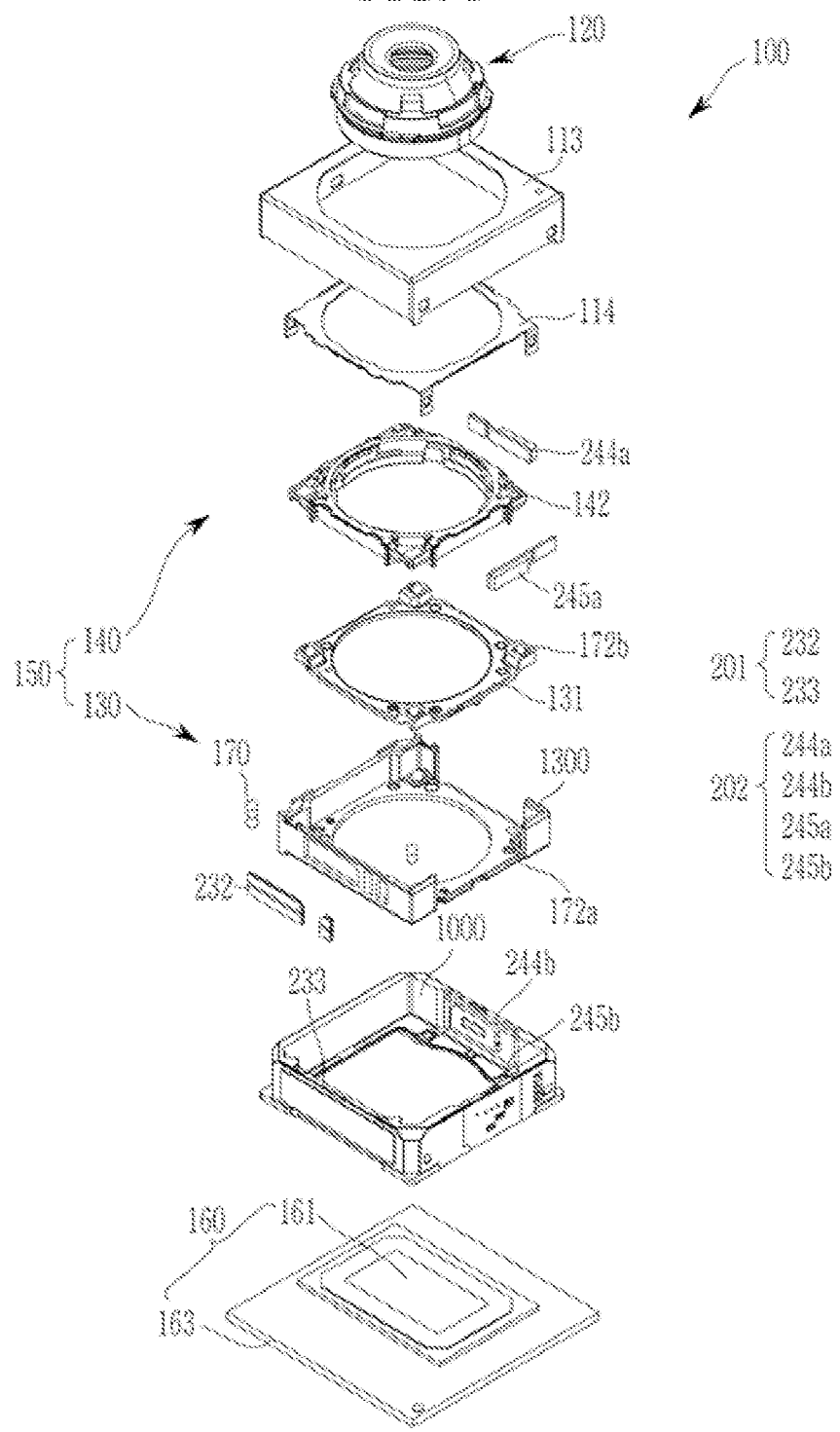
FIG. 1 illustrates a schematic exploded perspective view of a camera module according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated by 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The phrase "in a plan view" or "on a plane" means viewing a target portion from the top, and the phrase "in a cross-sectional view" or "on a cross-section" means viewing a cross-section formed by vertically cutting a target portion from the side.

Hereinafter, various embodiments and variations will be described in detail with reference to the drawings.

A camera module according to an embodiment will be described with reference to FIG. 1. FIG. 1 illustrates a schematic exploded perspective view of a camera module according to an embodiment.

Referring to FIG. 1, a camera module 100 according to an embodiment may include a lens barrel 120, a lens driving device 150 that moves the lens barrel 120, an image sensor unit 160 that converts light incident through the lens barrel 120 into an electrical signal, a housing 1000 accommodating the lens barrel 120 and the lens driving device 150, and a cover 113.

The lens driving device 150 is a device for moving the lens barrel 120, and may include a focus adjusting unit 130 for adjusting a focus and a shake correcting unit 140 for correcting a shake.

The lens barrel 120 may be accommodated in a lens holder 142, and the lens holder 142 and a guide member 131 may be accommodated in the focus adjusting unit 130.

The focus adjusting unit 130 may include a carrier 1300 accommodating the lens barrel 120, and a focus adjusting driver generating a driving force to move the lens barrel 120 and the carrier 1300 in an optical axis direction.

The focus adjusting driver may include a first lens driver 201 including a focus adjusting magnet 232 and a focus adjusting coil 233.

The focus adjusting magnet 232 of the first lens driver 201 may be mounted on one side surface of the carrier 1300.

The focus adjusting coil 233 of the first lens driver 201 may be a stamped metal part formed by a metal stamping method, and may be integrally combined with the housing 1000 by an injection molding method to form an injection-molded part. Although not shown in FIG. 1, a wire layer that transmits a driving current to the focus adjusting coil 233 may be a stamped metal part formed by the metal stamping method and may be electrically connected to the focus adjusting coil 233, and the wire layer may be integrally combined with the housing 1000 by an injection molding method to form an injection-molded part.

When the driving current is applied to the focus adjusting coil 233 through the wire layer, the carrier 1300 may be moved in the optical axis direction by an electromagnetic force generated between the focus adjusting magnet 232 and the focus adjusting coil 233. Since the lens barrel 120 is accommodated in the carrier 1300, the lens barrel 120 is also moved in the optical axis direction by the movement of the carrier 1300.

A first rolling unit 170 may be disposed between the carrier 1300 and the housing 1000 to reduce friction between the carrier 1300 and the housing 1000 when the carrier 1300 is moved. The first rolling unit 170 may include a plurality of ball members disposed on both sides of the focus adjusting magnet 232. Guide grooves may be formed in the carrier 1300 on both sides of the focus adjusting magnet so that the first rolling unit 170 is accommodated in the guide grooves to guide the carrier 1300 in the optical axis direction.

The shake correcting unit 140 includes the guide member 131 for guiding movement of the lens barrel 120 and a shake correcting driver for generating a driving force to move the guide member 131 in a direction perpendicular to the optical axis direction.

The guide member 131 and the lens holder 142 are inserted into the carrier 1300 so they are disposed in the optical axis direction, and serve to guide movement of the lens barrel 120 in the direction perpendicular to the optical axis direction.

The lens holder 142 may have a substantially quadrangular frame shape. Shake correcting magnets 244a and 245a may be disposed on two adjacent side surfaces of the lens holder 142. A stopper 114 may be disposed over the lens barrel 120 to prevent the lens holder 142 from being separated from an inner space of the carrier 1300, and the stopper 114 may be fastened to the carrier 1300.

The shake correcting driver may include a second lens driver 202, and the second lens driver 202 may include the shake correcting magnets 244a and 245a and shake correcting coils 244b and 245b respectively facing the shake correcting magnets 244a and 245a.

The shake correcting magnets 244a and 245a of the second lens driver 202 may be mounted on the lens holder 142.

The shake correcting coils 244b and 245b of the second lens driver 202 respectively facing the shake correcting magnets 244a and 245a may be stamped metal parts formed by a metal stamping method, and may be integrally combined with the housing 1000 by an injection molding method to form an injection-molded part. Although not shown in FIG. 1, two wire layers that respectively transmit driving currents to the shake correcting coils 244b and 245b may also be stamped metal parts formed by the metal stamping method and may be respectively electrically connected to the shake correcting coils 244b and 245b, and the two wire layers may be integrally combined with the housing 1000 by an injection molding method to form an injection-molded part.

When the driving currents are applied to the shake correcting coils 244b and 245b through the wire layers, the lens holder 142 may be moved in the direction perpendicular to the optical axis direction by electromagnetic forces generated between the shake correcting magnets 244a and 245a and the shake correcting coils 244b and 245b. Since the lens barrel 120 is accommodated in the lens holder 142, the lens barrel 120 is also moved in the direction perpendicular to the optical axis direction by the movement of the lens holder 142.

A plurality of second ball members 172a may be provided to support the guide member 131 on the carrier 1300 and maintain a spacing between the guide member 131 and the carrier 1300, and a plurality of third ball members 172b may be provided to support the lens holder 142 on the guide member 131 and maintain a spacing between the lens holder 142 and the guide member 131. The plurality of second ball members 172a and the plurality of third ball members 172b function to guide the lens holder 142 during a shake correcting operation.

The image sensor unit 160 is a device that converts light incident through the lens barrel 120 into an electrical signal. For example, the image sensor unit 160 may include an image sensor 161 and a printed circuit board 163 electrically connected to the image sensor 161, and may further include an infrared filter. The infrared filter blocks light in an infrared region in the light incident through the lens barrel 120.

The image sensor 161 converts the light incident through the lens barrel 120 into an electrical signal. For example, the image sensor 161 may be a charge coupled device (CCD) or a complementary metal-oxide semiconductor (CMOS) device. The electrical signal converted by the image sensor 161 is outputted as an image through a display unit of a portable electronic device. The image sensor 161 is mounted on the printed circuit board 163, and may be electrically connected to the printed circuit board 163.

At least a portion of the lens barrel 120 and the lens driving device are accommodated in a space inside the housing 1000. For example, the housing 1000 may have a box shape having openings in an upper surface and a lower surface thereof. The image sensor unit 160 is disposed on the lower surface of the housing 1000.

The cover 113 is fastened to the housing 1000 to cover an outer surface of the housing 1000, and serves to protect internal components of the camera module 100. In addition, the cover 113 may function to shield electromagnetic waves. For example, the cover 113 may shield electromagnetic waves generated by the camera module 100 so that the electromagnetic waves do not affect other electronic components in a portable electronic device in which the camera module 100 is mounted.

In addition, the cover 113 may shield electromagnetic waves generated by the other electronic components in the portable device so that the electromagnetic waves generated by the other electronic components do not affect the camera module 100.

The cover 113 may be made of a metallic material and may be grounded to a ground pad of the printed circuit board 163 to shield the electromagnetic waves generated by the camera module 100 and the electromagnetic waves generated by the other electronic components of the portable electronic device.

In addition, the focus adjusting driver and the shake correcting driver each may further include a sensing part for sensing the movement of the lens barrel 120, and the sensing part of the focus adjusting driver and the sensing part of the shake correcting driver each may be in a form of an IC package that may be controlled by a controller included in the printed circuit board 163 electrically connected to the image sensor 161.

Hereinafter, the coils and the wire layers that are the stamped metal parts formed by the metal stamping method, and that are integrally combined with the housing by an injection molding method, as described above, will be described in more detail.

Figure 2:
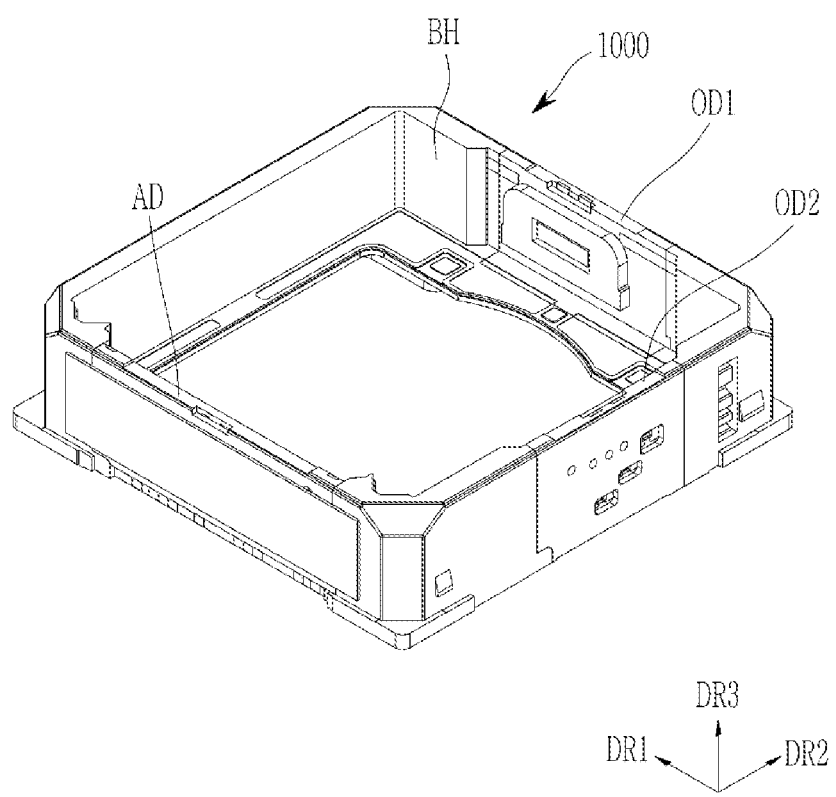
FIG. 2 illustrates a perspective view of a housing of the camera module of FIG. 1.
Figure 5:
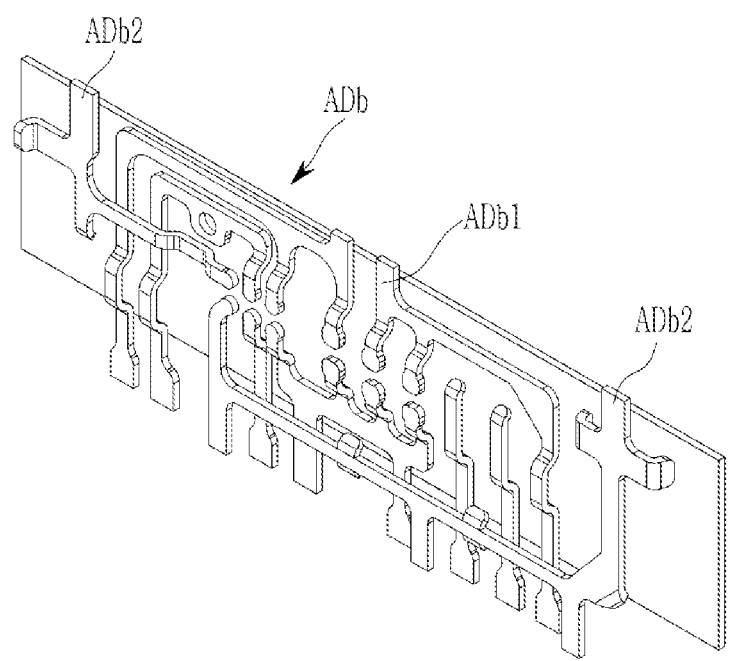
FIG. 5 illustrates a perspective view of a third wire layer of the housing of FIG. 3.
Figure 6:
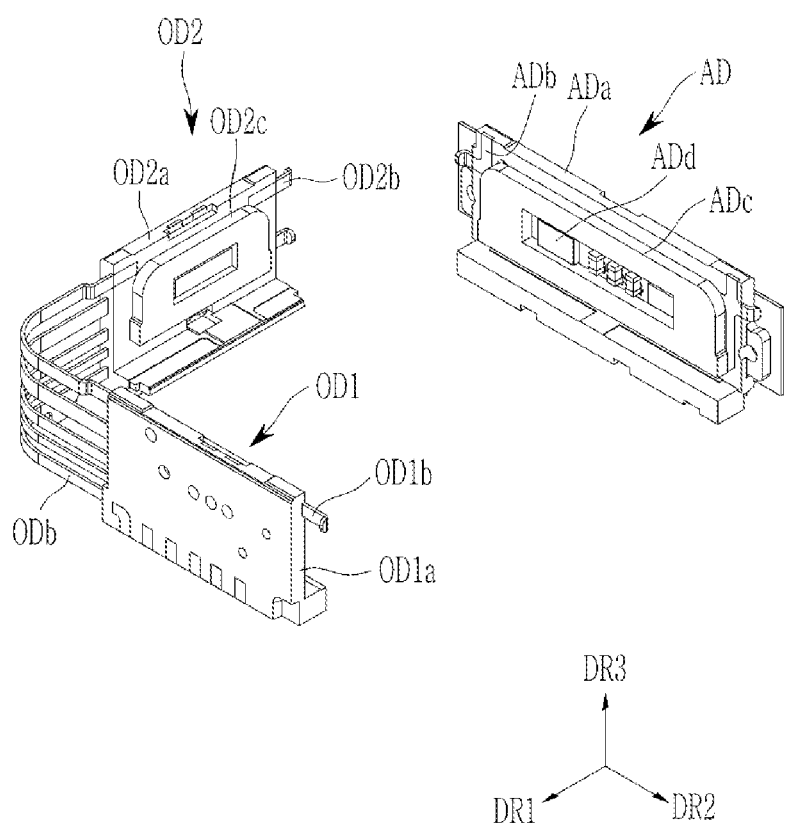
FIG. 6 illustrates a perspective view of a first driving part, a second driving part, and a third driving part of the housing of FIG. 3.

First, referring to FIG. 2 to FIG. 6, the housing 1000 of the camera module 100 of FIG. 1 will be described in more detail. FIG. 2 illustrates a perspective view of a housing of the camera module of FIG. 1, FIG. 3 illustrates an exploded perspective view of the housing of FIG. 2, FIG. 4 illustrates a perspective view of a first wire layer and a second wire layer of the housing of FIG. 3, FIG. 5 illustrates a perspective view of a third wire layer of the housing of FIG. 3, and FIG. 6 illustrates a perspective view of a first driving part, a second driving part, and a third driving part of the housing of FIG. 3.

Figure 3:
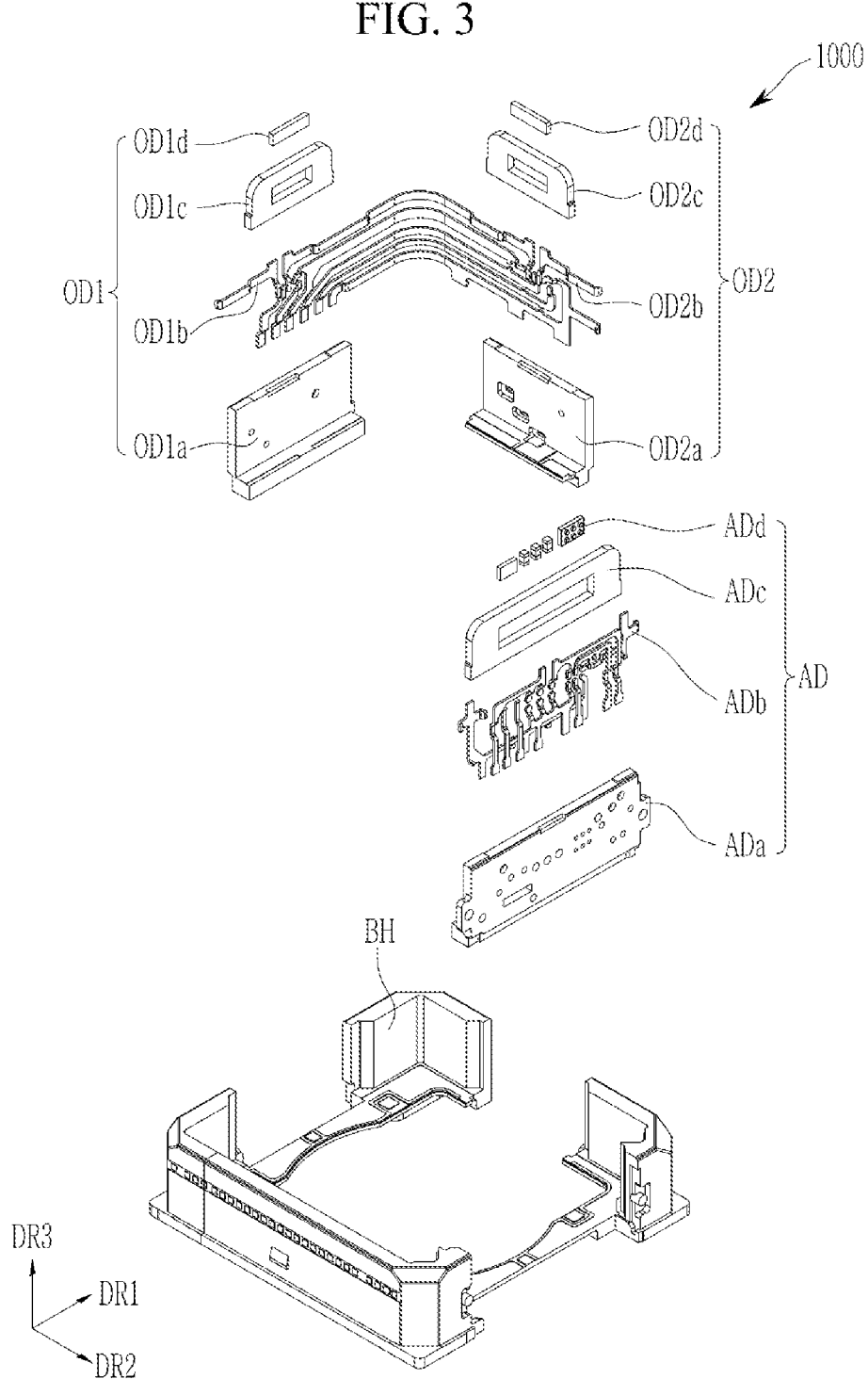
FIG. 3 illustrates an exploded perspective view of the housing of FIG. 2.

Referring to FIG. 2 and FIG. 3, the housing 1000 of the camera module 100 may include a base housing BH, and a first driving part OD1, a second driving part OD2, and a third driving part AD all integrally combined with the base housing BH by an injection molding method to form an injection-molded part.

The first driving part OD1 and the second driving part OD2 may be portions of the shake correcting driver, and the third driving part AD may be a portion of the focus adjusting driver. The first driving part OD1 and the second driving part OD2 may serve as a shake correcting driver together with the shake correcting magnets 244a and 245a mounted on the lens holder 142, and the third driving part AD may serve as a focus adjusting driver together with the focus adjusting magnet 232 mounted on the carrier 1300.

The first driving part OD1 may be substantially parallel to a first direction DR1, and the second driving part OD2 may be substantially parallel to a second direction DR2. The third driving part AD may be substantially parallel to the first direction DR1, and may face the first driving part OD1 in the second direction DR2. The first direction DR1 and the second direction DR2 may be directions perpendicular to a third direction DR3 parallel to an optical axis of the lens barrel 120 of the camera module 100.

The first driving part OD1 may include a first base part OD1a, a first wire layer OD1b, a first coil OD1c, and a first driving circuit part OD1d.

The second driving part OD2 may include a second base part OD2a, a second wire layer OD2b, a second coil OD2c, and a second driving circuit part OD2d.

The third driving part AD may include a third base part ADa, a third wire layer ADb, a third coil ADc, and a third driving circuit part ADd.

Referring to FIG. 4 and FIG. 5 together with FIG. 2 and FIG. 3, the first wire layer OD1b and the second wire layer OD2b may include a plurality of layers ODb1 and ODb2 that at least partially overlap each other and may be stamped metal parts formed by a metal stamping method. The third wire layer ADb may include a plurality of layers ADb1 and ADb2 that at least partially overlap each other and may be stamped metal parts formed by a metal stamping method.

The first wire layer OD1b of the first driving part OD1 and the second wire layer OD2b of the second driving part OD2 may be electrically connected to each other by a connection part ODb extending between the first wire layer OD1b parallel to the first direction DR1 and the second wire layer OD2b parallel to the second direction DR2. The connection part ODb may be curved to extend parallel to the first direction DR1 to connect to the first wire layer OD1b and extend parallel to the second direction DR2 to connect to the second wire layer OD2b. The connection part ODb may also include the plurality of layers ODb1 and ODb2.

Referring to FIG. 6 together with FIG. 2 to FIG. 5, the first wire layer OD1b and the first coil OD1c of the first driving part OD1 may be stamped metal parts formed by a metal stamping method. The first wire layer OD1b may be integrally combined with the first base part OD1a by an injection molding method, and the first coil OD1c and the first driving circuit part OD1d may be surface-mounted on the first base part OD1a by a surface-mount method of surface-mount technology (SMT).

The second wire layer OD2b and the second coil OD2c of the second driving part OD2 may be stamped metal parts formed by a metal stamping method. The second wire layer OD2b may be integrally combined with the second base part OD2a by an injection molding method, and the second coil OD2c and the second driving circuit part OD2d may be surface-mounted on the second base part OD2a by a surface-mount method of surface-mount technology (SMT).

The third wire layer ADb and the third coil ADc of the third driving part AD may be stamped metal parts formed by a metal stamping method. The third wire layer ADb may be integrally combined with the third base part ADa by an injection molding method, the third coil ADc and the third driving circuit part ADd may be surface-mounted on the third base part ADa by a surface-mount method of surface-mount technology (SMT).

The first base part OD1a, the second base part OD2a, and the third base part ADa of the first driving part OD1, the second driving part OD2, and the third driving part AD may include a material have a curing temperature that is substantially the same as a curing temperature of a material included in the base housing BH, and the material of the first base part OD1a, the second base part OD2a, and the third base part ADa may be the same as the material of the base housing BH. For example, the material of the first base part OD1a, the second base part OD2a, and the third base part ADa may be a resin, and the material of the base housing BH may be a resin that is the same as the resin of the first base part OD1a, the second base part OD2a, and the third base part ADa.

The first base part OD1a, the second base part OD2a, and the third base part ADa may be integrally combined with the base housing BH by inserting the first base part OD1a, the second base part OD2a, and the third base part ADa into a mold having a shape of the base housing BH, injecting a resin into the mold, and curing the resin to integrally combine the first base part OD1a, the second base part OD2a, and the third base part ADa with the base housing BH to prevent the first base part OD1a, the second base part OD2a, and the third base part ADa from being separated from the base housing BH. Accordingly, the first wire layer OD1b integrally combined with the first base part OD1a, the first coil OD1c and the first driving circuit part OD1d surface-mounted on the first base part OD1a, the second wire layer OD2b integrally combined with the second base part OD2a, the second coil OD2c and the second driving circuit part OD2d surface-mounted on the second base part OD2a, the third wire layer ADb integrally combined with the third base part ADa, and the third coil ADc and the third driving circuit part ADd surface-mounted on the third base part ADa may be mounted on the base housing BH without an additional assembly process.

The first wire layer OD1b, the second wire layer OD2b, and the third wire layer ADb may be electrically connected to the printed circuit board 163 to receive electrical signals from the printed circuit board 163 and transmit the electrical signals to the first coil OD1c, the second coil OD2c, the third coil ADc, the first driving circuit part OD1d, the second driving circuit part OD2d, and the third driving circuit part ADd through the first wire layer OD1b, the second wire layer OD2b, and the third wire layer ADb.

The housing 1000 of the camera module 100 may include the base housing BH, and the first driving part OD1, the second driving part OD2, and the third driving part AD all integrally combined with the base housing BH by an injection molding method to form an injection-molded part. The first driving part OD1, the second driving part OD2, and the third driving part AD may include the first base part OD1a, the second base part OD2a, and the third base part ADa that are cured together with the base housing BH to prevent the first base part OD1a, the second base part OD2a, and the third base part ADa from being separated from the base housing BH, and may further include the first wire layer OD1b integrally combined with the first base part OD1a, the first coil OD1c and the first driving circuit part OD1d surface-mounted on the first base part OD1a, the second wire layer OD2b integrally combined with the second base part OD2a, the second coil OD2c and the second driving circuit part OD2d surface-mounted on the second base part OD2a, the third wire layer ADb integrally combined with the third base part ADa, and the third coil ADc and the third driving circuit part ADd surface-mounted on the third base part ADa.

Accordingly, by forming the wire layers and the coils of the driving parts as stamped metal parts by a metal stamping method, integrally combining the wire layers with the base parts by an injection molding method, mounting the coils and the driving circuit parts on the base parts by a surface-mount method, and then curing the base parts together with the base housing, it is possible to form the housing including the plurality of driving parts without an additional assembly process, thereby reducing the manufacturing cost.

As described, by forming the wire layers of the driving parts as stamped metal parts by a metal stamping method and integrally combining the wire layers with the base parts by an injection molding method, the process of assembling an additional flexible circuit board for driving the carrier and the lens holder is unnecessary, thereby simplifying the manufacturing process and reducing the manufacturing cost. In addition, since the wire layers and the coils of the driving parts are integrally combined with the housing, it is possible to prevent a product quality deterioration due to changes in the positions of the wire layers and the coils.

Accordingly, it is possible to prevent an increase in manufacturing cost due to an additional assembly process, and to prevent a product quality deterioration due to an assembly process error.

Hereinafter, a manufacturing method of the housing 1000 of the camera module 100 of FIG. 1 will be described with reference to FIG. 7 to FIG. 17 together with FIG. 1 to FIG. 6. FIG. 7 to FIG. 17 illustrate a manufacturing method of the housing 1000 of the camera module 100 of FIG. 1.

Figure 7:
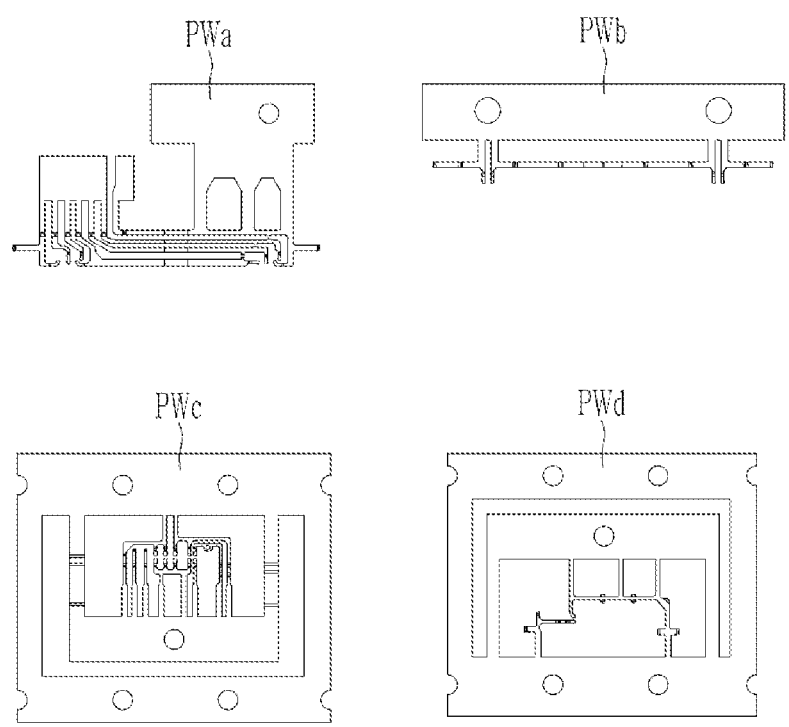
FIG. 7 to FIG. 17 illustrate a manufacturing method of the housing of the camera module of FIG. 1.

Referring to FIG. 7, a plurality of metal layers PWa, PWb, PWc, and PWd are formed as stamped metal parts by a metal stamping method.

Among the plurality of metal layers PWa, PWb, PWc, and PWd, a first metal layer PWa includes the layer ODb1 of the first wire layer OD1b, the second wire layer OD2b, and the connection part ODb, a second metal layer PWb includes the layer ODb2 of the first wire layer OD1b, the second wire layer OD2b, and the connection part ODb. Also, among the plurality of metal layers PWa, PWb, PWc, and PWd, a third metal layer PWc includes the layer ADb1 of the third wire layer ADb, and a fourth metal layer PWd includes the layer ADb2 of the third wire layer ADb.

The plurality of metal layers PWa, PWb, PWc, and PWd are then plated. For example, the plurality of metal layers PWa, PWb, PWc, and PWd may be plated using nickel (Ni) or gold (Au).

Figure 8:
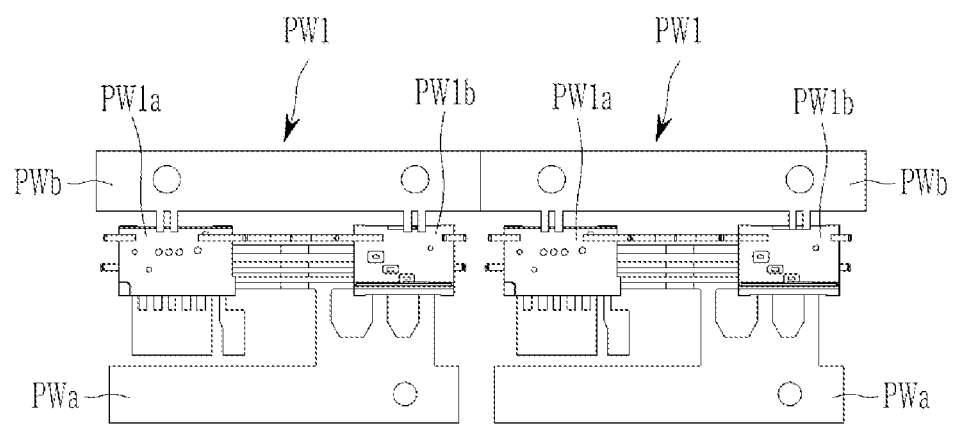
Figure 9:
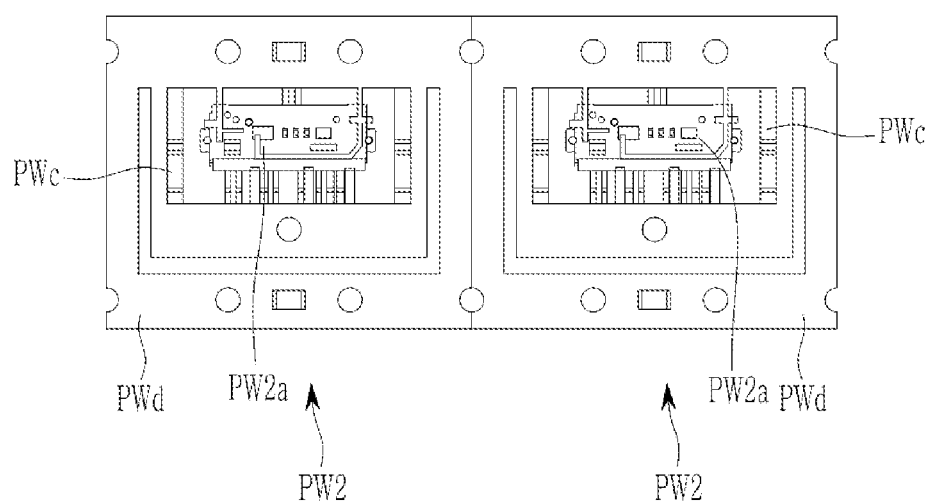

Next, as shown in FIG. 8 and FIG. 9, the first metal layer PWa and the second metal layer PWb are integrally combined with a first base part PW1a and a second base part PW1b by an injection molding method to form a plurality of first component parts PW1, and the third metal layer PWc and the fourth metal layer PWd are integrally combined with a third base part PW2a by an injection molding method to form a plurality of second component parts PW2. However, only one of the first component parts PW1 in FIG. 8 and only one of the second component parts PW2 in FIG. 9 are needed for one housing 1000. Accordingly, the other one of the first component parts PW1 in FIG. 8 and the other one of the second component parts PW2 in FIG. 9 may be used for another housing 1000.

Each of the plurality of first component parts PW1 may include the first wire layer OD1b of the first driving part OD1 and the second wire layer OD2b of the second driving part OD2, and each of the plurality of second component parts PW2 may include the third wire layer ADb of the third driving part AD.

Figure 10:
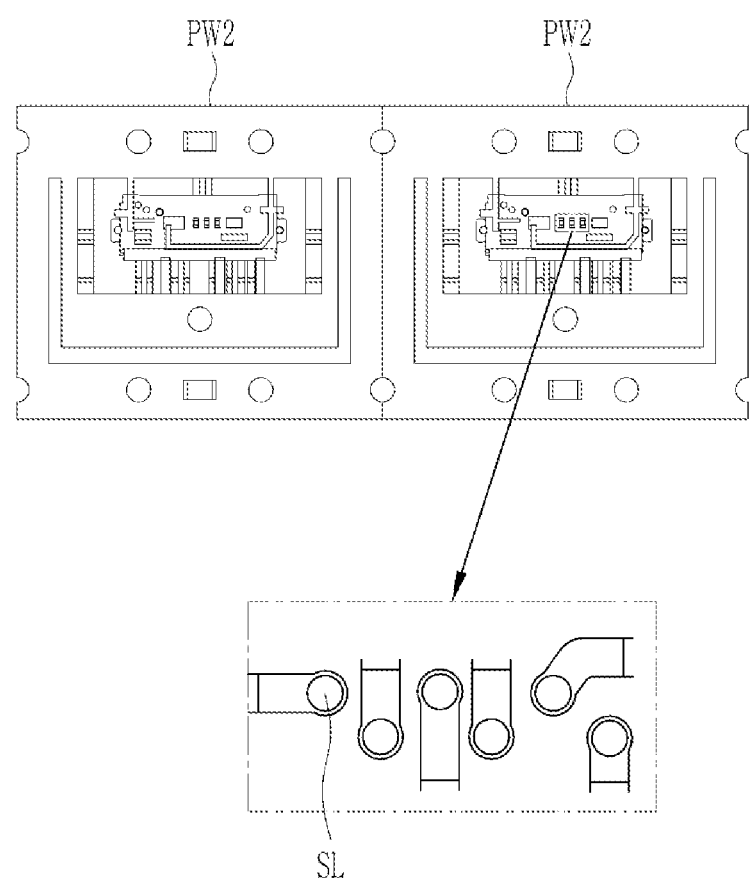

Next, as shown in FIG. 10, a plurality of connection terminals SL for electrical connection with the third driving circuit part ADd are formed on each of the plurality of second part parts PW2. For example, each of the connection terminals SL may be a solder terminal and may include tin (Sn), but is not limited thereto.

Although only the plurality of second component parts PW2 are illustrated in FIG. 10, the same process is performed on the plurality of first component parts PW1. Specifically, a plurality of connection terminals SL for electrical connection with the first driving circuit part OD1d and the second driving circuit part OD2d are formed on each of the plurality of first component parts PW1.

Figure 11:
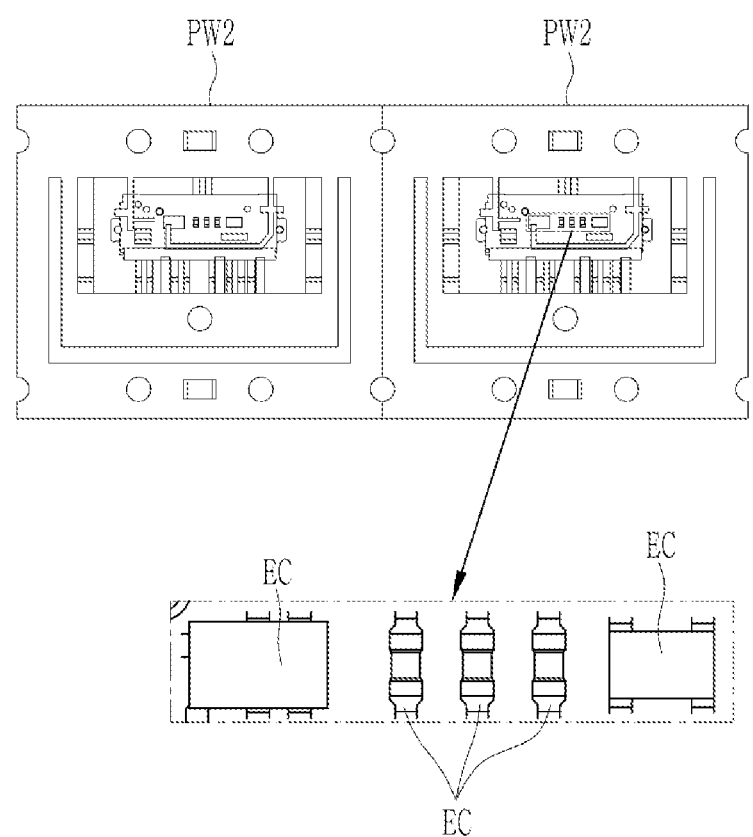

Referring to FIG. 11, electronic components EC corresponding to the third driving circuit part ADd are connected to and mounted on the plurality of connection terminals SL of each of the plurality of second component parts PW2 by a surface-mount method.

Although only the plurality of second component parts PW2 are illustrated in FIG. 11, the same process may be performed on the plurality of first component parts PW1. Specifically, electronic components EC corresponding to the first driving circuit part OD1d and the second driving circuit part OD2d are connected to and mounted on the plurality of connection terminals of each of the plurality of first component parts PW1 by a surface-mount method.

Figure 12:
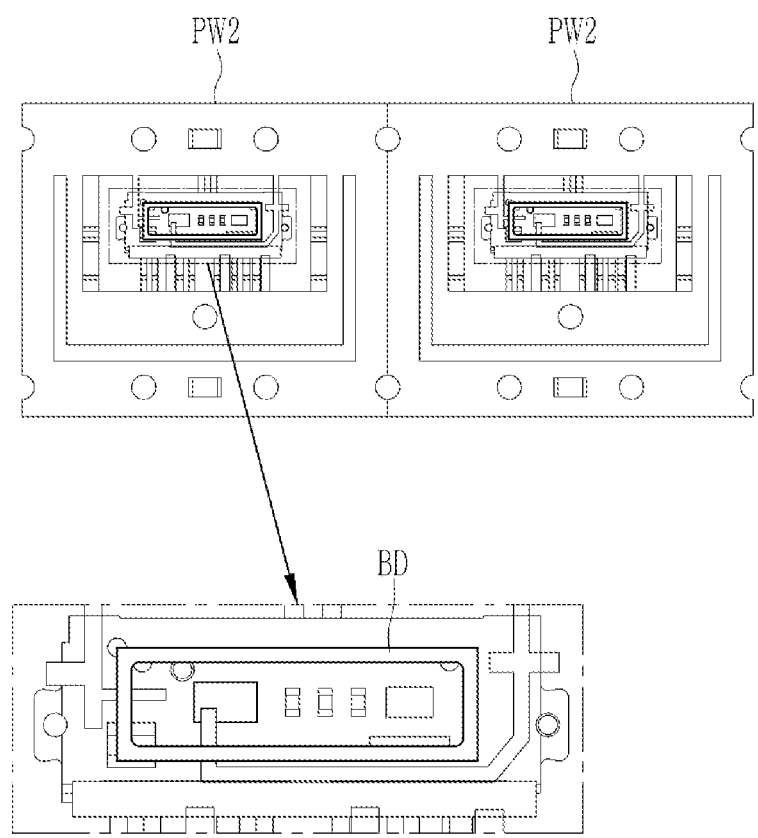

Next, as shown in FIG. 12, an adhesive layer BD is formed in an area in which the third coil ADc is to be mounted on each of the plurality of second component parts PW2.

Although only the plurality of second component parts PW2 are illustrated in FIG. 12, the same process may be performed on the plurality of first component parts PW1. Specifically, adhesive layers are formed in areas in which the first coil OD1c and the second coil OD2c are to be mounted on each of the plurality of first component parts PW1.

Figure 13:
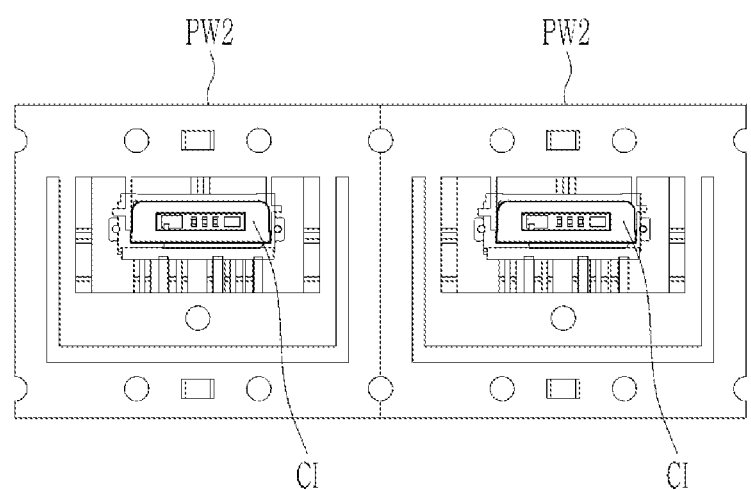

Next, referring to FIG. 13, a coil CI corresponding to the third coil ADc is mounted on the adhesive layer BD of each of the plurality of second component parts PW2. The coil CI may also be formed as a stamped metal part by a metal stamping method, but is not limited thereto.

Although only the plurality of second component parts PW2 are illustrated in FIG. 13, the same process may be performed on the plurality of first component parts PW1. Specifically, coils corresponding to the first coil OD1c and the second coil OD2c are mounted on the adhesive layers BD of each of the plurality of first component parts PW1.

Figure 14:
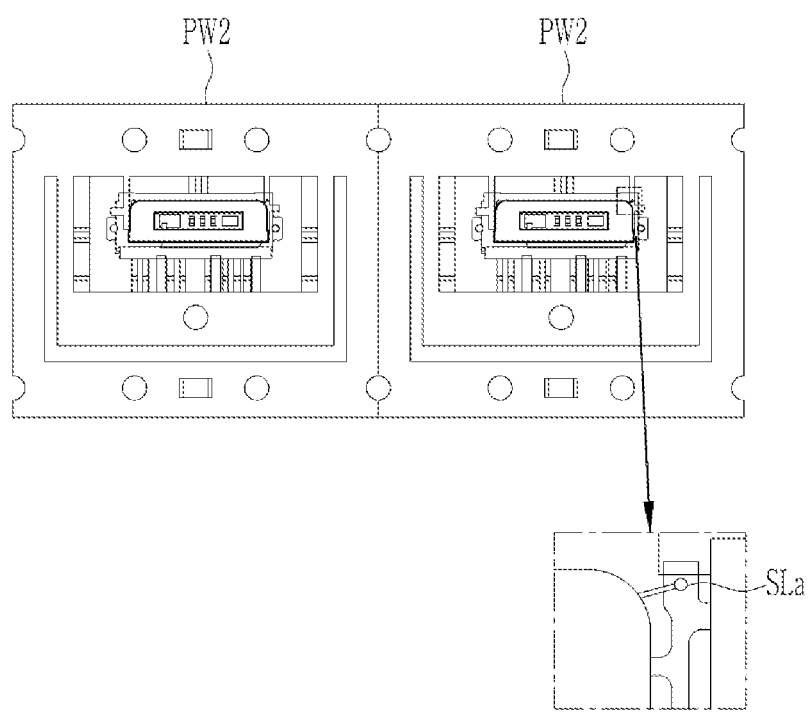

Next, as shown in FIG. 14, a connection part SLa for electrical connection with the third coil ADc is formed on each of the plurality of second component parts PW2.

Although only the plurality of second component parts PW2 are illustrated in FIG. 14, the same process may be performed on the plurality of first component parts PW1. Specifically, connection parts SLa for electrical connection with the first coil OD1c and the second coil OD2c are formed on each of the plurality of first component parts PW1.

Figure 15:
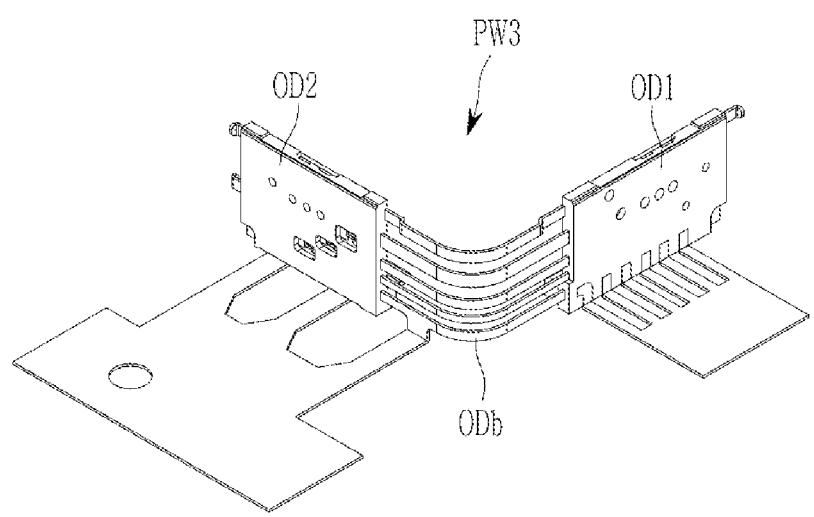
Figure 16:
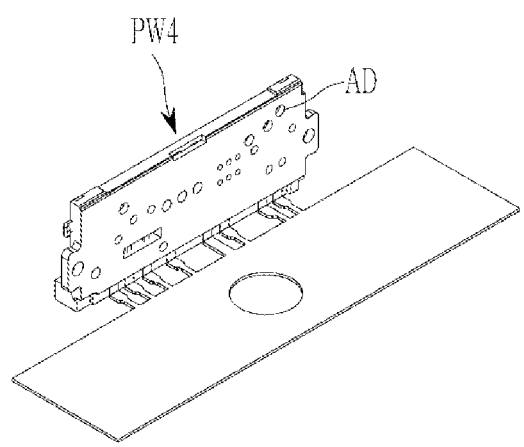

Next, unnecessary edge portions of the first component parts PW1 and the second component parts PW2 that do not overlap the first base part PW1a, the second base part PW1b, and the third base part PW2a are processed with shape processing such as cutting and bending as necessary, so that as shown in FIG. 15 and FIG. 16, a third component part PW3 corresponding to the first driving part OD1, the second driving part OD2, and the connection part ODb and a fourth component part PW4 corresponding to the third driving part AD are formed.

FIG. 15 illustrates the third component part PW3 corresponding to the first driving part OD1, the second driving part OD2, and the connection part ODb, and FIG. 16 illustrates the fourth component part PW4 corresponding to the third driving part AD.

Figure 17:
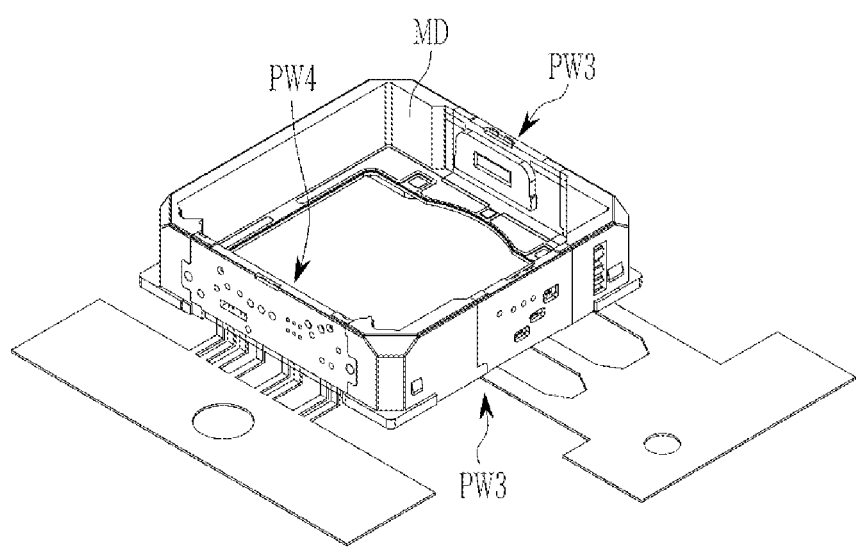

Referring to FIG. 17, after combining the third component part PW3 and the fourth component part PW4 to an injection-molded part MD corresponding to the base housing BH, the first base part PW1a, the second base part PW1b, the third base part PW2a, and the injection-molded part MD are cured together to prevent the first base part PW1a, the second base part PW1b, and the third base part PW2a from being separated from the injection-molded part MD.

Thereafter, remaining unnecessary edge portions of the plurality of first component parts PW1 and the plurality of second component parts PW2 are removed, and an electrical test is performed, so that the housing 1000 of the camera module as shown in FIG. 2 is completed.

As described above, according to the manufacturing method of the camera module according to the embodiment, after the wire layers of the driving parts of the camera module are formed as stamped metal parts by a metal stamping method and after the wire layers, the driving circuit parts, and the coils are surface-mounted on the base parts by the surface-mount method, the base parts and the injection-molded part forming the base housing are combined with each other and cured together, thereby forming the driving parts integrally combined with the injection-molded part. Accordingly, the housing including the driving parts may be formed without an additional assembly process, thereby reducing the manufacturing cost. In addition, by forming the wire layers and the coils of the driving parts to be integrally combined with the housing, it is possible to prevent a product quality deterioration due to a change in the positions of the wire layers and the coils of the driving parts.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and are not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module comprising:
a lens barrel;
a driver configured to move the lens barrel; and
a housing in which the lens barrel is disposed,
wherein the driver comprises:
a wire layer configured to transmit an electrical signal;
a driving circuit part electrically connected to the wire layer;
a coil electrically connected to the wire layer; and
a magnet electromagnetically coupled to the coil, and
the wire layer is a stamped metal part integrally combined with the housing.

2. The camera module of claim 1, wherein the housing comprises a base housing and a base part,
the wire layer is supported by the base part, and
the base housing and the base part are integrally combined in an injection-molded part.

3. The camera module of claim 2, wherein a curing temperature of a material of the base housing is substantially the same as a curing temperature of a material of the base part.

4. The camera module of claim 2, wherein the wire layer is integrally combined with the base part.

5. The camera module of claim 1, wherein the wire layer and the coil are integrally combined with the housing.

6. The camera module of claim 5, wherein the coil is a stamped metal part.

7. The camera module of claim 6, wherein the housing comprises a base housing and a base part,
the wire layer is supported by the base part,
the coil is mounted on the base part, and
the base housing and the base part are integrally combined in an injection-molded part.

8. The camera module of claim 7, wherein the wire layer is integrally combined with the base part, and
the coil is surface-mounted on the base part.

9. The camera module of claim 1, wherein the wire layer, the coil, and the driving circuit part are integrally combined with the housing.

10. The camera module of claim 9, wherein the housing comprises a base housing and a base part,
the wire layer is integrally combined with the base part,
the coil and the driving circuit part are surface-mounted on the base part, and
the base housing and the base part are integrally combined in an injection-molded part.

11. The camera module of claim 1, wherein the driver comprises:
a focus adjusting driver configured to move the lens barrel in an optical axis direction of the lens barrel and comprising a first wire layer; and
a shake correcting driver configured to move the lens barrel in a direction perpendicular to the optical direction and comprising a second wire layer, and
the first wire layer of the focus adjusting driver and the second wire layer of the shake correcting driver are stamped metal parts integrally combined with the housing.

12. The camera module of claim 11, wherein the shake correcting driver comprises a first shake correcting driver and a second shake correcting driver,
the second wire layer of the shake correcting driver comprises a second wire layer of the first shake correcting driver and a second wire layer of the second shake correcting driver, and
the second wire layer of the first shake correcting driver and the second wire layer of the second shake correcting driver are electrically connected to each other.

13. The camera module of claim 11, wherein the coil of the driver comprises a first coil of the focus adjusting driver and a second coil of the shake correcting driver, and
the first coil of the focus adjusting driver and the second coil of the shake correcting driver are stamped metal parts integrally combined with the housing.

14. A method of manufacturing a housing of a camera module, the method comprising:
forming a wire layer of a driver configured to drive a lens barrel by a metal stamping method;
mounting the wire layer so that the wire layer is supported by a base part;
combining the base part and a base housing by an injection molding method to form an injection-molded part; and
curing the injection-molded part.

15. The method of claim 14, wherein the mounting of the wire layer comprises integrally combining the wire layer with the base part by an injection molding method.

16. The method of claim 15, further comprising:
forming a coil of the driver; and
mounting the coil on the base part.

17. The method of claim 16, wherein the forming of the coil comprises forming the coil by a metal stamping method.

18. A camera module comprising:
an injection-molded housing;
a lens barrel disposed in the injection-molded housing; and
a driver configured to move the lens barrel and comprising:
an injection-molded base part integrally combined with the injection-molded housing;
a stamped metal wire layer integrally combined with the injection-molded base part;
a driving circuit part electrically connected to the stamped metal wire layer;
a coil electrically connected to the stamped metal wire layer; and
a magnet electromagnetically coupled to the coil.

19. The camera module of claim 18, wherein the coil is surface-mounted on the injection-molded base part.

20. The camera module of claim 18, wherein the driving circuit part is surface-mounted on the injection-molded base part.

21. The camera module of claim 18, wherein the injection-molded housing comprises a base housing integrally combined with the injection-molded base part to form the injection-molded housing.

* * * * *